United States Patent [19]

Goerlich

[11] Patent Number: 4,887,426

[45] Date of Patent: Dec. 19, 1989

[54] PROCESS AND DEVICE FOR OPERATING AN EXHAUST GAS BURNER

[75] Inventor: Dieter Goerlich, Emmering, Fed. Rep. of Germany

[73] Assignee: Webasto AG Fahrzeugtechnik, Stockdorf, Fed. Rep. of Germany

[21] Appl. No.: 235,293

[22] Filed: Aug. 23, 1988

[30] Foreign Application Priority Data

Aug. 28, 1987 [DE] Fed. Rep. of Germany ....... 3728713

[51] Int. Cl.$^4$ .............................................. F01N 3/02
[52] U.S. Cl. ......................................... 60/274; 60/286
[58] Field of Search .................................. 60/274, 286

[56] References Cited

U.S. PATENT DOCUMENTS 4,535,588 8/1985 Sato ....................................... 60/286
4,574,589 3/1986 Hasegawa .............................. 60/286

Primary Examiner—Douglas Hart
Attorney, Agent, or Firm—Sixbey, Friedman, Leedom & Ferguson

[57] ABSTRACT

A process for operating an exhaust gas burner that can be used particularly in the regeneration of soot filters or the like, in which the exhaust gas burner is turned on to start the regeneration or the like only if the oxygen content in the exhaust gas has a sufficiently high value to readily support ignition. For this determination, recourse is, preferably, had to the instantaneous values of engine performance characteristics reflective of the presence of a high oxygen content in the exhaust gas, e.g., a low engine speed and/or low average pressure valve of the engine. For the determination, the accelerator position and/or the revolutions per minute of the internal combustion engine can be monitored. In the device, a control device is connected, upstream from the turning-on device of the exhaust gas burner, that activates the turning-on device only if the oxygen content in the exhaust gas has a sufficiently high value. For this purpose, the control device can be connected to a detection device that obtains appropriate data from sensors for predetermined engine-operation parameters.

7 Claims, 2 Drawing Sheets

PROCESS AND DEVICE FOR OPERATING AN EXHAUST GAS BURNER

BACKGROUND OF THE INVENTION

The invention relates to a process for operating an exhaust gas burner, particularly in the regeneration of soot filters or the like, especially with regard to the turning on of the exhaust gas burner to start the process. Further, the invention also relates to a device for operating an exhaust gas burner that has a turning-on control device.

In regeneration units, particularly of soot filters in diesel internal combustion engines using an exhaust gas burner, a problem exists in that the oxygen content of the exhaust gases is subject to fluctuations which depend chiefly on the instantaneous engine performance characteristics. However, when the oxygen content of the exhaust gas is low, starting, that is igniting, of an exhaust gas burner which is operated with the exhaust gases as the combustion air source causes extremely great difficulties. In many cases, the ignition spark energy delivered by an ignition device, up to now, has been insufficient. Thus, the process of regenerating a downstream soot filter unit, for example, cannot be started satisfactorily. Furthermore, attempts to commence burner ignition under unsatisfactory conditions is not only futile, but is also destructive from a wear standpoint as well as from the effects of excess fuel accumulations resulting from repeated unsuccessful startup attempts. Examples of soot filtering units that utilize an exhaust gas burner for regeneration purposes can be found in commonly owned U.S. patent application Ser. Nos. 196,557 and 196,558, filed May 20, 1988 by the present applicant.

SUMMARY OF THE INVENTION

Thus, a primary object of the present invention is to provide a process and a device for operating an exhaust gas burner of the initially mentioned type, with which ignition is attempted only under conditions when the exhaust gas burner can be reliably ignited.

According to the invention, a process for operating an exhaust gas burner, particularly in the regeneration of soot filters or the like, is distinguished in that burner ignition is initiated only if the oxygen content in the exhaust gas has a sufficiently high value and/or the rate of flow thereof is sufficiently small.

Therefore, in the process for operating an exhaust gas burner according to the invention, before initiating burner ignition, the oxygen content in the exhaust gas serving as an oxygen carrier (combustion air source) for the exhaust gas burner is taken into account along with its rate of flow. In this way, misfiring of the exhaust gas burner can be avoided and, particularly, the regeneration process attempted only when it can be started reliably.

In a preferred manner, the average pressure of the engine and/or the engine speed are utilized as control parameters for turning on the exhaust gas burner. Here, the oxygen content of the exhaust gas can be determined in accordance with the instantaneous engine performance characteristics, since characteristics resulting in the exhaust gas having a high oxygen content occur when the engine is working with small amounts of fuel being injected and are associated with low average pressure values of the engine, and low engine speeds and loads. Thus, these factors may be used jointly or separately to provide information in regard to the existence of a high oxygen content in the exhaust gas. Furthermore, these parameters can be determined easily and, in most engine designs, the means for doing so is already present because these conditions are determined for controlling the operation of the internal combustion engine. Accordingly, these measurable variables can be used in the process for operating the exhaust gas burner according to the invention without requiring sensing equipment not already existing in association with the engine with which it is performed.

A device for operating an exhaust gas burner, particularly in the regeneration of soot filters or the like, is distinguished, according to the invention, in that a control device is provided that activates a turning-on device of the exhaust gas burner only if the oxygen content in the exhaust gas has a sufficiently high value. Therefore, with the help of the device according to the invention, the turning on of the exhaust gas burner can be operated as a function of the oxygen content in the exhaust gas by a control device to insure that ignition is commenced only under sufficiently favorable conditions to provide a high likelihood of success.

The control device is, preferably, connected to a detection device for determining the instantaneous average pressure of the engine and/or the engine speed. This detection device can be integrated in the control device, or the control device according to the invention may be connected to appropriate detection devices which, possibly, are already present for control of the engine operation. The instantaneous average pressure of the engine can be determined, e.g., through measurement of the fuel injection quantity, or the engine output torque so that, with an appropriately small fuel injection quantity, the turning-on device of the exhaust gas burner is then activated. Alternatively, sensors for detecting the accelerator position and/or engine rpm can be connected to the detection device. With a sufficiently low engine speed, optionally the turning-on device of the exhaust gas burner can then be activated as a function of the accelerator position or exhaust flow rate.

Of course, the detection device can also detect and process other/more engine operating parameters and then supply them to the control device to control burner turn-on as a function of the desired control variables.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE PREFERRED EMBODIMENT

Figure 1:
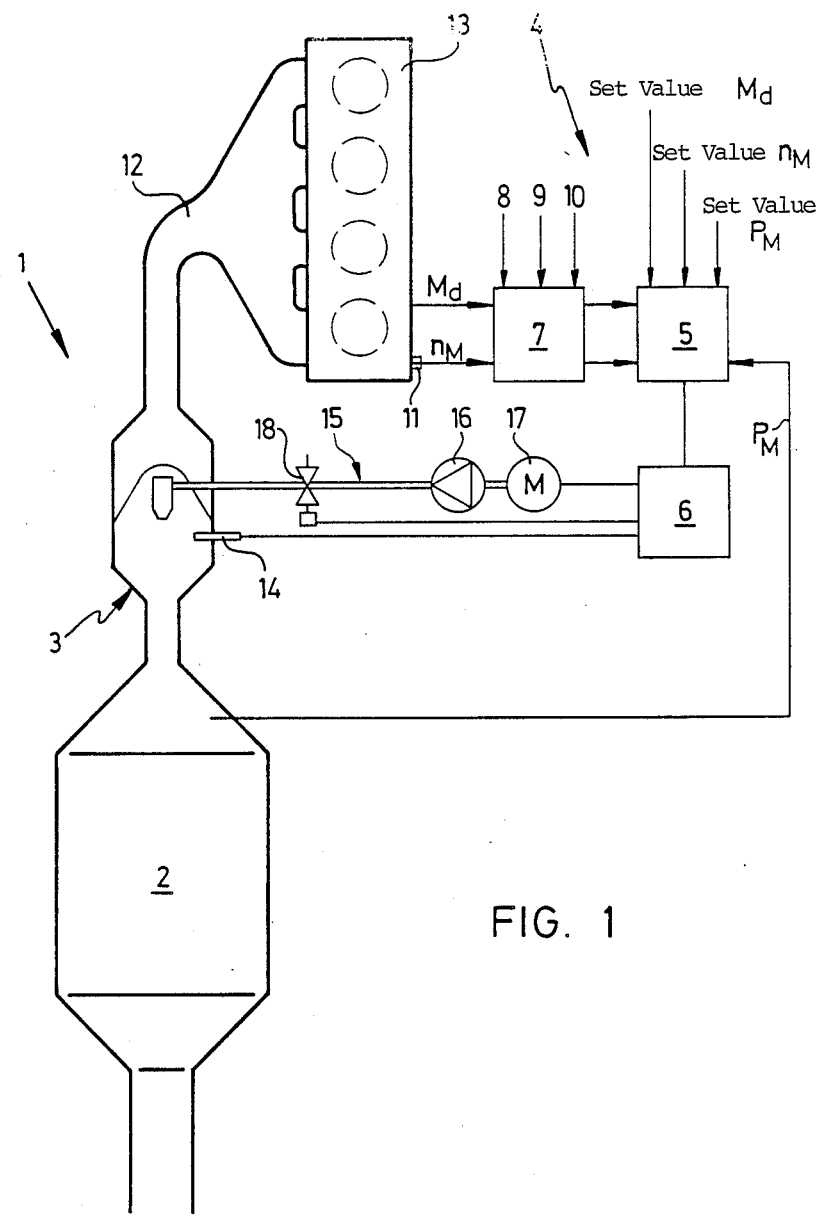
FIG. 1 is a diagrammatic view of a device for operating an exhaust gas burner.

In the diagrammatic view according to FIG. 1, a soot filter unit that is placed in exhaust gas line 12 of a diesel internal combustion engine 13 is designated 1, as a whole. This soot filter unit 1 comprises a soot filter 2 and an exhaust gas burner 3, associated with it, that is operated with the exhaust gas in line 12 as an oxygen carrier, i.e., as a combustion air supply. Exhaust gas burner 3 has an ignition device 14 and a fuel supply device 15 that comprises, e.g., a fuel atomizing nozzle supplied via a pump 16 with drive motor 17 and solenoid valve 18.

To operate exhaust gas burner 3, an operating device designated 4, as a whole, is shown. In the embodiment represented, device 4 comprises a control device 5, a turning-on device 6 and a detection device 7 for determining the instantaneous value of performance characteristics of internal combustion engine 13. Turning-on device 6 is connected to fuel supply device 15 and ignition device 14 of exhaust gas burner 3. Control device 5 receives, as inputs, the outputs of detection device 7, which can be the engine speed $n_M$ and/or engine torque moment $M_d$, and/or the average pressure $P_M$ of the exhaust flow, and/or, optionally, other parameters reflective of the oxygen content of the exhaust gases from engine 13. For the respective parameters to be processed in control device 5, appropriate set points, such as a suitable value for $M_d$ and/or for $n_M$ and/or for $P_M$, etc., are preset through other inputs of control device 5.

If regeneration of soot filter 2 in soot filter unit 1 is necessary, a comparison of the set points with the actual values provided by detection device 7 is carried out in control device 5. Depending on the choice of the preset set points, the processing in control device 5 then takes place in such a way that, if the set point and actual values and the comparison carried out in regard to them, show that the oxygen content in the exhaust gas is high, control device 5 delivers a signal, "burner on," to turning-on device 6, which then, in turn, activates fuel supply device 15 and ignition device 14. Exhaust gas burner 3 then begins to work and can be started without difficulty since the exhaust gases, utilized as a combustion air source by exhaust gas burner 3, have a high enough oxygen content to enable a relatively ignitable fuel mixture to be produced. The hot combustion gases delivered by exhaust gas burner 3 are supplied to soot filter 2, so that its regeneration can be started.

In the embodiment represented, outputs of several sensors are connected to detection device 7. For example, 8 may be the output from an exhaust gas flow rate sensor, 9 can be the output of an average pressure sensor, 10 may be the output of an accelerator position sensor, 11 can be an engine rpm sensor, etc., on the basis of which the sufficiency of the exhaust gas oxygen content may be established.

If appropriate sensors are already associated with the internal combustion engine for some other control engineering reasons, for example, for controlling the engine operation, the layout represented in the FIG. 1 can be simplified in that the appropriate outputs of these existing sensors can either be supplied directly to detection device 7 or, optionally, the outputs are supplied directly to control device 5, which then delivers the appropriate signal to turning-on device 6. Of course, it is also possible, as an alternative, to integrate control device 5 for triggering exhaust gas burner 3 into an overall control system for the internal combustion engine. Since a microprocessor is usually present in such cases, it then suffices to provide for appropriate processing steps in the programmed processing of the information in the microprocessor, and then to trigger turning-on device 6 for exhaust gas burner 3 directly through the microprocessor.

Figure 2:
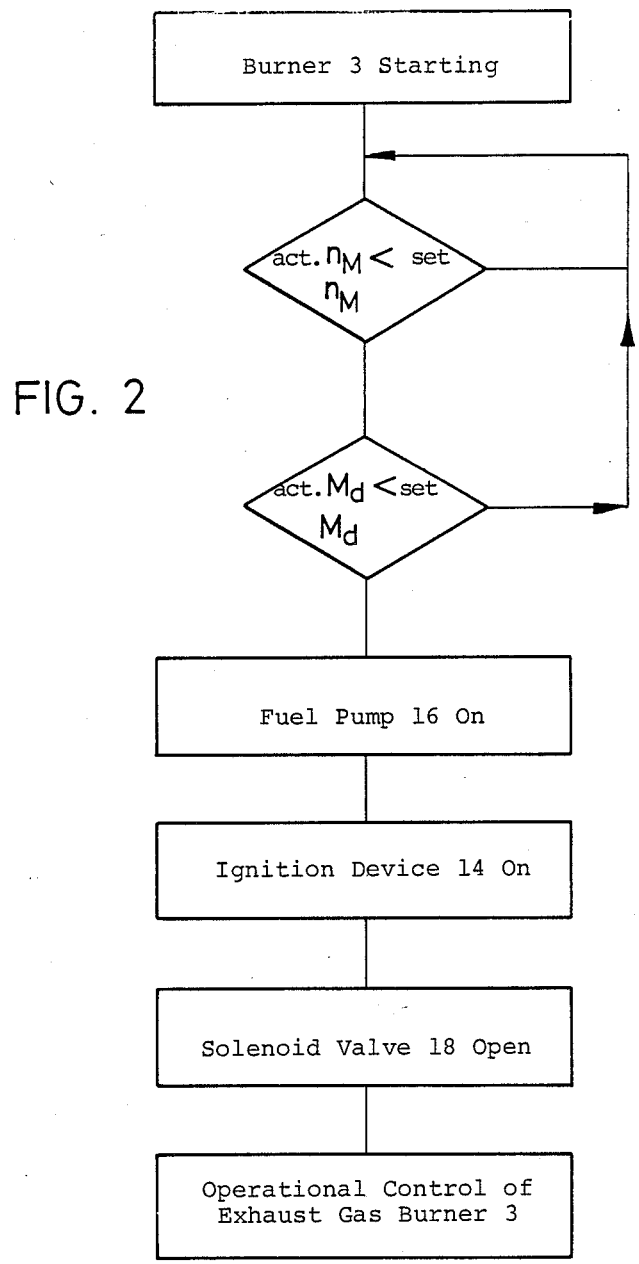
FIG. 2 is an example of a flow diagram in the form of a flow chart to explain the course of the process according to the invention for operating the exhaust gas burner.

The functioning of the process for operating exhaust gas burner 3, according to the invention, is explained diagrammatically by FIG. 2. When starting of burner 3 is initiated, first, the set points and actual values for controlling parameters are compared. For example, the preset and actual values of the engine speed $n_M$ are compared, and if the actual $n_M$ value is smaller than the set point $n_M$, a comparison of the engine torque values $M_d$ is carried out in a subsequent step. The engine torque values $M_d$ are substantially proportional to the average pressure of the cylinders of the engine, so that these values $M_d$ are, for example, representative of the instantaneous average pressure of the engine. If the actual value for the engine torque $M_d$ is smaller than the set point for the engine torque $m_d$, device 6 of exhaust gas burner 3 is turned on, e.g., by turning-on device 6, represented in FIG. 1. For this purpose, pump 16 of fuel supply device 15 is turned on, and ignition device 14 of exhaust gas burner 3 is then subsequently put into operation. Solenoid valve 18 in fuel supply device 15 is also opened. Subsequent to this, the working of exhaust gas burner 3 is then controlled according to the desired course of operation.

If, on the other hand, the actual value of the engine speed $n_M$ and/or the engine torque value $M_d$ is greater than or equal to the corresponding set points, turning-on device 6 is not activated and the programmatic course of the process is then continued again with the comparisons of the actual values and set points indicated as examples until the conditions indicated in the first two steps in FIG. 2 are satisfied, due to changes in the engine performance characteristics having brought about an increase in the oxygen content of the exhaust gases.

In accordance with the quantities detected with the detection device, even more influencing variables can, of course, also be detected in a similar manner to obtain reliable information to the effect that a high oxygen content is present in the exhaust gas. For example, comparison of the actual and set values of the average pressure or flow rate of the exhaust gases in exhaust line 12 may be performed instead of or in addition to the engine torque comparison step.

Of course, the invention is not limited to the present examples, but numerous changes and modifications are possible, which the man of the art will make, if required, without departing from the inventive concept. Thus, for example, several of the parameters described above for determining the existence of a sufficiently high oxygen content in the exhaust gas can be taken into consideration or a selection of them can be made, or these parameters can possibly be combined with each other as a function of other parameters. IT is also possible to provide an oxygen sensor in the exhaust gas line 12 of the soot filter unit 1 upstream of burner 3, so that the oxygen content in the exhaust gas can be directly detected and measured and then, by preprogramming a set point or threshold value, turning-on device 6 for exhaust gas burner 3 can be directly controlled in an appropriate manner. Therefore, the invention should not be viewed as limited to the details shown and described herein, but rather covers all such changes and modifications as are encompassed by the scope of the appended claims.

I claim:

1. Process for operating an exhaust gas burner, particularly in the regeneration of soot filters or the like, in which the exhaust gas burner is turned on to start the regeneration or the like, comprising the steps of detecting of at least one condition reflective of the oxygen content of exhaust gases supplied to the exhaust gas burner as a combustion air supply and initiating ignition of the burner only if the oxygen content in the exhaust gas reflected by the value of the condition detected represents a sufficiently high value to reliably enable ignition of the burner to be achieved.

2. Process according to claim 1, wherein said at least one condition detected is at least one of average pressure of the engine and engine speed.

3. Process for operating an exhaust gas burner according to claim 2, wherein at least the condition detected of the average pressure of the engine is engine load as determined by a preset accelerator position.

4. Device for operating an exhaust gas burner, particularly in the regeneration of soot filters or the like, with a turning-on device for the exhaust gas burner, wherein sensing means for detecting of at least one condition reflective of the oxygen content of exhaust gases supplied to the exhaust gas burner as a combustion air supply, and a control means for activating said turning-on device are provided, said control means being operative for activating said turning-on device only if the oxygen content in the exhaust gas reflected by the value of the condition detected represents a sufficiently high value to reliably enable ignition of the burner to be achieved.

5. Device according to claim 4, wherein said sensing means comprises means for detecting the value of at least one of the instantaneous average pressure of the engine and engine speed.

6. Device according to claim 5, wherein sensor means also comprises means for detecting engine load as a function of accelerator position.

7. Device according to claim 4, wherein sensor means comprises means for detecting engine load as a function of accelerator position.

* * * * *